United States Patent Office 3,427,367
Patented Feb. 11, 1969

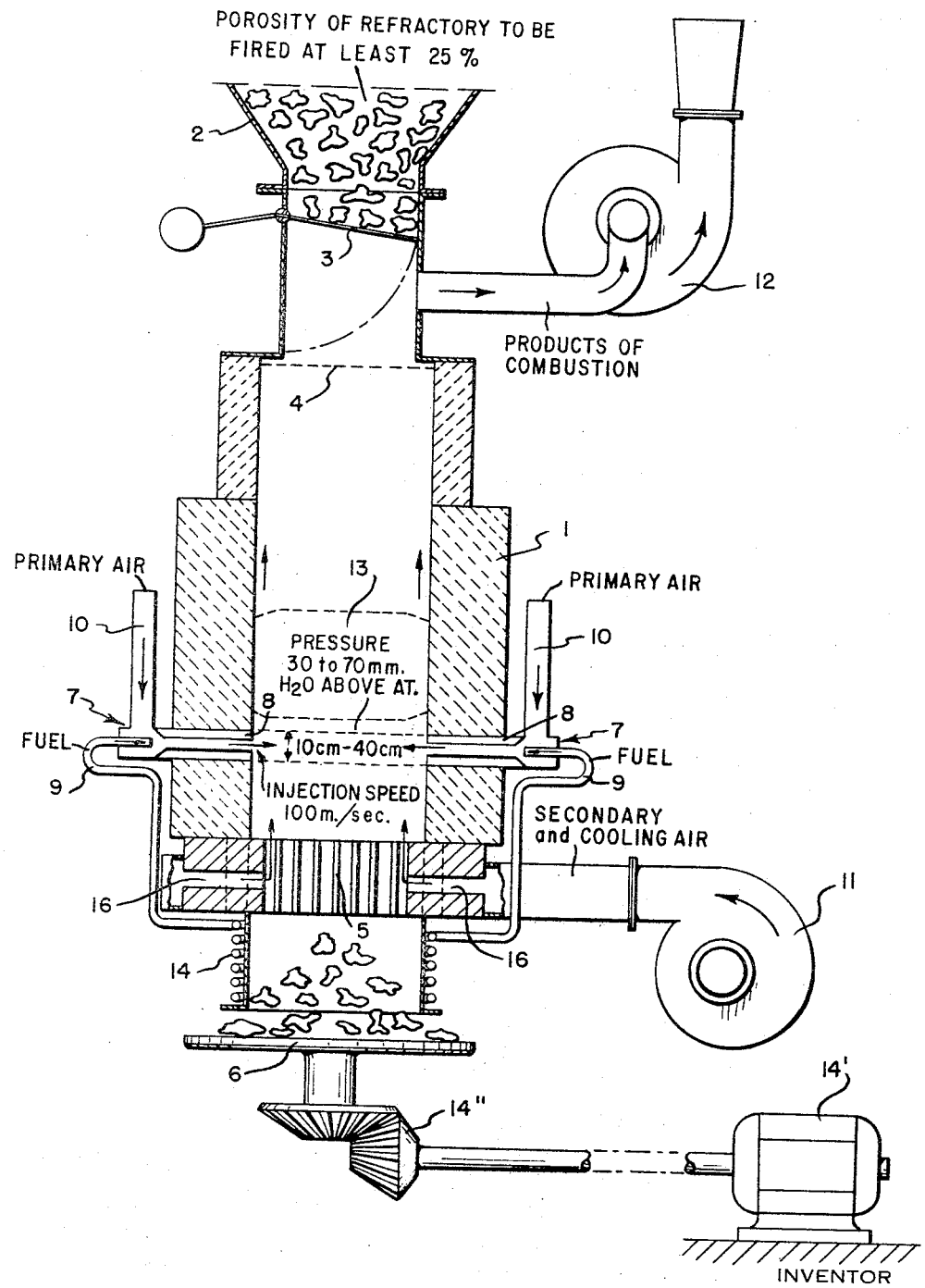

3,427,367
PREFIRING OF REFRACTORY MATERIALS
Jean-Pierre Kiehl, Lyon, France, assignor to Societe Generale Des Produits Refractaires, Paris, France, a corporation of France
Filed Oct. 4, 1966, Ser. No. 584,167
Claims priority, application France, Oct. 5, 1965, 33,724
U.S. Cl. 263—52          14 Claims
Int. Cl. F27b 1/08, 1/20

---

ABSTRACT OF THE DISCLOSURE

There is disclosed a method of roasting or calcining refractory materials in which crushed refractory material having a porosity of at least 25%, and preferably between 35% and 45%, preferably with an average particle size between 5 mm. and 40 mm., is fed to the upper end of a column. A mixture of fuel and combustion-supporting gas is injected into the column over a zone of limited height of the order of 10 to 30 cm., at a level below the upper end of the charge of material therein, and at a velocity of at least 100 meters per second, to maintain in that zone a pressure between 30 and 70 mm. of water above atmospheric. Secondary air is introduced into the column below that zone, the calcined product being evacuated through the lower end of the column while the products of combustion pass out at the upper end of the column.

---

The present invention relates to the roasting or calcining of refractory raw materials, and provides a method and apparatus whereby such materials may be roasted or calcined at unusually high temperatures with minimum wear on the furnace or kiln in which that firing takes place. The materials treated in accordance with the invention may be used in the manufacture of refractory products such as firebrick and other shaped pieces, and while the manufacture of such finished products involves a firing of the shaped pieces made from the product of the present invention (customarily after a crushing thereof), the heating operation of the present invention will hereinafter for simplicity be referred to as firing.

Rotary kilns cannot in practice be carried to temperatures above some 1750° to 1800° C. for firing raw refractory materials such as dolomite, magnesite, corundum, and the like. Since the necessary thermal exchange is to be effected by contact between the gaseous products of combustion and the materials to be fired, the temperature of these gases must be substantially higher than the 1750° to 1800° C. range just mentioned in order that the interior of the mass to be fired may be raised to that range of temperature. With such combustion gas temperatures the refractory walls of the kiln are subjected to particularly difficult conditions and deteriorate rapidly. Moreover, the large volumes of combustion gases required to achieve these temperatures in a rotary kiln result in carry-off with those gases of substantial quantities of the finely divided particles of the material to be treated. The losses thus occasioned may reach from 30 to 40% of the tonnage input to the kiln.

In straight or vertical kilns the firing may be effected either in alternated beds of the material to be treated and of solid fuel, or by firing from the side with the help of burners for liquid or gaseous fuels which produce their flame in one or more combustion chambers.

In the first case, the material to be fired is contaminated by the ashes of the coal or coke. Additionally, to achieve a proper draft through the mass to be treated, the fuel is introduced in particles of controlled and calibrated size, the complete combustion of which requires a relatively long time and makes it impossible to concentrate or localize the zone of maximum temperature as would be desirable. Thus kilns of this type, i.e. stationary kilns in which the fuel and refractory to be fired are disposed in alternate beds, do not make it possible to achieve temperatures in the refractory of 1800° C. or above.

In the case of kilns employing liquid or gaseous fuels, there is observed an excess firing of the material to be fired where the combustion products emerge from the combustion chambers, and insufficient firing of the remainder of the charge. So far as I am aware, no kiln operating with lateral firing of gaseous or liquid fuels burned in separately provided combustion chambers has been operated for firing minerals on a commercial scale at temperatures above 1800° C.

The present invention provides a method and apparatus for firing refractory materials at higher temperatures. In accordance with the invention a vertical kiln is fed at the upper end thereof with crushed and dustfree material to be fired having such a distribution of particle size that the porosity of the charge is above 25% and such that on the average the large dimension of the voids between the grains or pieces has at least a 5 mm. dimension. With such a charge, a mixture of fuel and of at least part of the combustion-supporting gas necessary thereto is injected into a zone of the kiln which is fixed and which is of small thickness, generally between 10 and 30 cm., the fuel and air or other combustion-supporting gas being injected at a velocity dependent on the cross-sectional dimensions of the kiln but which is at least 100 meters per second. This zone may for convenience be called a "sintering zone." The charge to be fired is lowered in controlled fashion through the kiln and the fired or calcined charge is evacuated through the bottom. The gases of combustion pass out at the upper end of the kiln.

The porosity of the charge is defined as the ratio of the voids between grains to the apparent total volume of the charge.

In accordance with the invention, and particularly in consequence of the high injection speed of the fuel and combustion-supporting medium, the combustion is caused to take place entirely in the voids of the charge, all the way in to the axis of the kiln. Hence the temperature achieved is applied to the totality of the charge during its passage through the sintering zone wherein the fuel and combustion-supporting medium are injected and burned. Within this zone the temperature of the charge is uniform from the walls of the kiln to the center thereof, whereas the walls of the kiln are not heated above the firing temperature of the charge. Hereinafter this mode of firing will be called "focused firing."

The invention will now be further described in terms of the presently preferred practice thereof and in terms of a presently preferred embodiment of the kiln thereof by reference to the accompanying drawing in which the single figure of drawing is a schematic vertical axial section through a kiln according to the invention and permitting practice of the process of the invention.

In the drawing reference character 1 identifies the refractory lining of the kiln, which is of circular cross-section although the invention is not in any of its aspects limited to kilns of that cross-section. Above the kiln and more particularly above the lining which defines the firing space, is disposed a hopper 2 by means of which the kiln is charged, the trap door for control of charging being shown at 3. The upper level of the charge is indicated at 4. Reference character 5 identifies a refractory grate permitting injection of secondary and cooling air about the walls of the kiln by means of a blower 11. Reference character 6 identifies a plate or hearth for withdrawal of the calcined charge, this plate being driven by a motor 14' through bevel gears 14". The burners generally indicated at 7 are disposed in a ring in the brickwork or masonry of the kiln, which is not illustrated. They deliver a mixture of fuel and combustion-supporting gas into the charge along directions which are angularly between radial directions and directions tangential to the outer limit of the firing chamber. Each burner comprises a mixing tube 8 of refractory steel which is fed with fuel through a tube 9 on the axis thereof and with primary air through a tube 10, producing a flow of air initially around the fuel. Mixing of the fuel and air or other combustion-supporting gas takes place along the length of the tube 8. The pressures of the air and fuel in tubes 10 and 9 and the length and shaping of the tube 8 are such that the mixture emerges from the tube 8 with a speed of at least 100 meters per second. This primary air is injected at a pressure between about 0.5 and 2 atmospheres, at a speed above 100 meters per second and preferably of the order of 250 meters per second. The fuel is preheated at 14 in a coil surrounding the lower end of the kiln below the grate 5. The flame chilling air is delivered through an annular conduit 16 around the mixing tube 8. Draft is provided by means of an exhaust blower 12. By reason of this draft the zone of focused combustion is disposed at 13, somewhat above the plane of the burners.

In accordance with the method of the invention, firing of the charge is effected by injection of the mixture of fuel and combustion-supporting gas into the heart of the charge at a speed which is greater than the speed of propagation of flame in that fuel-gas mixture. The porosity of the charge, which is made up of particles between 5 and 40 mm. in size, is above 25% and is preferably between 35% and 45%.

In order that the firing be uniform over the entire combustion zone, the zone of combustion is preferably maintained at a supra-atmospheric pressure of from 30 to 70 mm. of water, for example by appropriate control on the blower effecting withdrawal of the combustion gases. That is to say, control of the blower 12 will be effective to adjust the pressure within the kiln.

The injection of the fuel-gas mixture can be made by burners either radially or otherwise directed, disposed in a horizontal plane about the kiln. In order to effect localization of focusing of the firing, at least 50% and preferably from 70 to 75% of the air necessary to combustion is sent, mixed with the fuel, into the charge at high velocity.

There can be employed a quantity of combustion-supporting gas corresponding to complete burning of the fuel. In this way one achieves in the mass being fired temperatures of the order of 1800° C. with ordinary fuel oil and without preheating of the air, either that introduced through the burners or that introduced through the bottom of the kiln. To obtain higher temperatures with commercially available grades of fuel oil, the combustion-supporting air can be preheated either for introduction through the burners or through the bottom of the kiln. It is also possible to enrich the combustion-supporting air with oxygen. If it is desirable to obtain temperatures below 1800° C., it is sufficient to increase the quantity of air introduced to a level above that necessary to insure complete combustion. A preferred method for the introduction of this excess air is to inject it through an annular space disposed about the burners.

The secondary air is injected at the lower part of the kiln through a ring 5 made up of refractory bricks having slots between them of a width less than 10 mm. and preferably of the order of 5 mm. By reason of the loss of charge produced by the mass of mineral, an important part of this secondary air flows from the bottom to the top of the kiln in an annular stream along the walls thereof, protecting these walls at the level of the focused combustion zone and preventing them from reaching the maximum temperatures which prevail in that zone at the heart of the charge. All adhesion of material on the walls of the kiln is thus avoided. The remainder of the secondary air flows from the bottom to the top of the kiln through the heart of the charge, efficiently cooling the lower portion of the kiln so as to arrive greatly preheated in the zone of focused firing.

The thermal efficiency of combustion attained by the method of the invention is very high. For example, the consumption of fuel oil is between 100 and 120 kilograms per metric ton of calcined dolomite. Moreover, the cost of construction of the kiln is reduced. For a given throughput the cost of construction of a battery of kilns operating according to the process of the invention amounts to only one-fifth to one-fourth of the cost of rotating kilns of the same capacity.

Burners may pass through the masonry of the kiln via cylindrical passages provided for that purpose. It is desirable for these passages to have a diameter sufficient so as to leave an annular space between the walls of the kiln and the tubes which carry the burners. This space is swept through by a slow current of air which prevents excessive heating of the tubes.

With excellent thermal efficiency, the invention provides a very high degree of homogeneity in the quality of the refractory products obtained. It can be applied to kilns of any cross-section, for example elliptic as well as circular or polygonal. For a given firing temperature, and comparatively to the known kilns in which heat is transmitted for example to the mass from or around the wall, it has the advantage of permitting a substantial increase in the cross-section, or in the minimum dimension of the cross-section, of the mass to be fired. Said dimension may be higher than 50 cm.

It will thus be seen that the invention provides a method of firing refractory material which comprises feeding crushed raw refractory material having a porosity of at least 25% (and preferably between 35% and 45%) to the upper end of a column, injecting into the column at a location below the upper end thereof a mixture of fuel and combustion-supporting gas at a velocity of at least 100 meters per second, and evacuating the calcined refractory material from the column below that location with the gaseous products of combustion being preferably evacuated from the top of the column. Preferably the fuel is a fluid fuel. The average length of the long dimension of the voids in the refractory material as fed into the column is desirably at least 5 mm., and the average size of the particles of the charge fed into the column is preferably between about 5 mm. and 40 mm. The mixture of fuel and combustion-supporting gas is preferably injected into the column over a height of between about 10 cm. and 30 cm., and there is preferably maintained within that portion of the column into which the fuel-air mixture is injected a pressure between about 30 and 70 mm. of water above atmospheric.

According to another feature of the preferred practice of the method of the invention, secondary air is introduced into the column below the location of injection of the fuel-air mixture, the secondary air so introduced being in amount less than 50% (and preferably between 25% and 30%) of the air required for combustion of the fuel in that mixture. The mixture of fuel and air or other combustion-supporting gas is desirably introduced in a plurality of streams directed inwardly of the column from an annular array of locations about the periphery of the column, the fuel and air being mixed at each of those locations by flow of the air about a central stream of fuel. The secondary air is moreover desirably introduced in an annular flow about the walls of the column to cool the same, whereas the combustion-supporting gas is desirably preheated for increased maximum temperatures, and may be enriched with oxygen.

According to another aspect thereof, the invention provides a kiln for the prefiring of refractory raw materials. The kiln of the invention comprises a substantially vertical column as shown at 1 in the drawing and means such as the hopper 2 to introduce raw refractory material at the upper end of the column. The kiln of the invention further comprises means such as the array of tubes 8, 9 and 10 to introduce into the column, annularly around the periphery thereof and at a speed of at least 100 meters per second, a mixture of fluid fuel and combustion-supporting gas. It also includes a grate 5 below the fuel introducing means, means such as blower 11 to introduce a stream of air into the column below the fuel mixture introducing means, means such as the rotating hearth 6 to withdraw prefired refractory material from the column below the grate, and means such as the blower 12 to withdraw at the upper end of the column the products of combustion of the fuel.

While the invention has been described hereinabove in terms of the presently preferred practice of the method thereof and in terms of a presently preferred embodiment of the kiln thereof, the invention itself is not limited to the practice and embodiments so described but rather comprehends all modifications thereon and all departures therefrom properly falling within the spirit and scope of the appended claims.

I claim:
1. A method of firing refractory material which comprises feeding crushed, raw refractory material having a porosity of at least 25% to the upper end of a column to form a charge of refractory material within the column, injecting into the voids of the charge at a location below the top of the charge and at a velocity of at least 100 meters per second a mixture of fuel and combustion-supporting gas, causing combustion of the fuel therein, evacuating the calcined refractory material from the bottom of the column, and evacuating the products of combustion from the top of the column.

2. A method according to claim 1 wherein said fuel is a fluid fuel.

3. A method according to claim 1 wherein the average length of the long dimension of the voids in said refractory material as fed into the column is at least 5 mm.

4. A method according to claim 1 wherein the said porosity is between 35% and 45%.

5. A method according to claim 1 wherein the average size of the particles fed into the column is between 5 mm. and 40 mm.

6. A method according to claim 1 including the step of maintaining within that portion of the column into which said mixture is injected a pressure of between about 30 and 70 mm. of water above atmospheric.

7. A method according to claim 1 including the step of preheating said combustion-supporting gas.

8. A method according to claim 1 including the step of enriching said combustion-supporting gas with oxygen.

9. A method according to claim 1 wherein said combustion-supporting gas is combined with said fuel in annular spaces about central streams of fuel.

10. A method according to claim 1 wherein said mixture of fuel and combustion-supporting gas is injected into the column over a height of between about 10 cm. and 30 cm.

11. A method according to claim 10 wherein said mixture is injected into the column in a plurality of streams extending inwardly from an annular array of mixing points adjacent the walls of the column.

12. A method according to claim 1 including the step of introducing secondary air into the column below said location, the secondary air so introduced being in amount less than 50% of the air required for combustion of the fuel in said mixture.

13. A method according to claim 12 in which said secondary air is an amount between about 25% and 30% of the air required for combustion of the fuel in said mixture.

14. A method according to claim 12 in which said secondary air is introduced in an annular flow about the walls of the column to cool the same.

References Cited

UNITED STATES PATENTS

| | | | |
|---|---|---|---|
| 2,464,304 | 3/1949 | Gottlieb | 263—53 XR |
| 3,085,022 | 4/1963 | Koch | 263—53 XR |
| 3,140,864 | 7/1964 | Lellep | 263—29 |
| 3,284,071 | 11/1966 | Azbe | 263—29 |

CARLTON R. CROYLE, *Primary Examiner.*

ALLAN D. HERRMANN, *Assistant Examiner.*

U.S. Cl. X.R.

263—29